(12) United States Patent
Yi

(10) Patent No.: US 10,645,675 B2
(45) Date of Patent: May 5, 2020

(54) METHOD AND APPARATUS FOR PROVIDING MBMS SERVICE FOR LOW COMPLEXITY USER EQUIPMENT IN WIRELESS COMMUNICATION SYSTEM

(71) Applicant: LG Electronics Inc., Seoul (KR)

(72) Inventor: Yunjung Yi, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/545,784

(22) PCT Filed: Jan. 26, 2016

(86) PCT No.: PCT/KR2016/000828
§ 371 (c)(1),
(2) Date: Jul. 24, 2017

(87) PCT Pub. No.: WO2016/122193
PCT Pub. Date: Aug. 4, 2016

(65) Prior Publication Data
US 2018/0020426 A1 Jan. 18, 2018

Related U.S. Application Data

(60) Provisional application No. 62/108,031, filed on Jan. 26, 2015.

(51) Int. Cl.
*H04W 72/00* (2009.01)
*H04W 72/04* (2009.01)
(Continued)

(52) U.S. Cl.
CPC ......... *H04W 72/005* (2013.01); *H04L 5/0092* (2013.01); *H04W 4/06* (2013.01);
(Continued)

(58) Field of Classification Search
CPC . H04W 72/005; H04W 4/70; H04W 52/0209; H04W 72/0406; H04L 5/0092
(Continued)

(56) References Cited

U.S. PATENT DOCUMENTS 9,320,016 B2 * 4/2016 Maeda ............ H04W 28/0205
2009/0207771 A1 * 8/2009 Lindskog ........... H04L 12/1868
370/312
(Continued)

FOREIGN PATENT DOCUMENTS

| WO | 2014069944 | 5/2014 |
| WO | 2014182105 | 11/2014 |
| WO | 2014185659 | 11/2014 |

OTHER PUBLICATIONS

LG Electronics Inc., "Initial procedure and consideration points for the coverage enhancement of MTC UEs," R1-133370, 3GPP TSG RAN WG1 #74, Barcelona, Spain, Aug. 10, 2013.
(Continued)

*Primary Examiner* — Shahriar Behnamian
(74) *Attorney, Agent, or Firm* — Dentons US LLP

(57) ABSTRACT

A method and apparatus for providing a multimedia broadcast multicast service (MBMS) service for a low-complexity user equipment (UE) in a wireless communication system is provided. In one embodiment, a UE requiring coverage enhancement receives information on repetition for coverage enhancement, and receives the MBMS service according to the information repetition for coverage enhancement.

6 Claims, 11 Drawing Sheets

(51) Int. Cl.
*H04L 5/00* (2006.01)
*H04W 4/06* (2009.01)
*H04W 4/70* (2018.01)
*H04W 52/02* (2009.01)
*H04W 48/12* (2009.01)

(52) U.S. Cl.
CPC ......... *H04W 4/70* (2018.02); *H04W 52/0209* (2013.01); *H04W 72/0406* (2013.01); *H04L 5/0048* (2013.01); *H04L 5/0053* (2013.01); *H04W 48/12* (2013.01); *Y02D 70/00* (2018.01); *Y02D 70/1224* (2018.01); *Y02D 70/1242* (2018.01); *Y02D 70/1262* (2018.01); *Y02D 70/142* (2018.01); *Y02D 70/146* (2018.01); *Y02D 70/21* (2018.01); *Y02D 70/23* (2018.01)

(58) Field of Classification Search
USPC .......................................... 455/450
See application file for complete search history.

(56) References Cited

U.S. PATENT DOCUMENTS

| 2010/0103814 | A1* | 4/2010 | Chun | H04L 1/1893 370/225 |
| 2011/0261751 | A1* | 10/2011 | Ode | H04W 72/005 370/315 |
| 2012/0093051 | A1* | 4/2012 | Xu | H04L 12/1895 370/311 |
| 2012/0230347 | A1* | 9/2012 | Gao | H04W 72/005 370/432 |
| 2013/0040691 | A1* | 2/2013 | Ode | H04B 7/022 455/524 |
| 2014/0098761 | A1 | 4/2014 | Lee et al. | |
| 2016/0174014 | A1* | 6/2016 | You | H04B 7/2656 370/312 |
| 2016/0338013 | A1* | 11/2016 | Yu | H04L 1/0001 |
| 2016/0345314 | A1* | 11/2016 | Webb | H04W 4/70 |

OTHER PUBLICATIONS

Section 15 of 3GPP TS 36.300 V11.7.0.
Section 5.8 of 3GPP TS 36.331 V11.5.0.

* cited by examiner

METHOD AND APPARATUS FOR PROVIDING MBMS SERVICE FOR LOW COMPLEXITY USER EQUIPMENT IN WIRELESS COMMUNICATION SYSTEM

CROSS-REFERENCE TO RELATED APPLICATIONS

This application is the National Stage filing under 35 U.S.C. 371 of International Application No. PCT/KR2016/000828, filed on Jan. 26, 2016, which claims the benefit of U.S. Provisional Application No. 62/108,031 filed on Jan. 26, 2015, the contents of which are all hereby incorporated by reference herein in their entirety.

BACKGROUND OF THE INVENTION

Field of the Invention

The present invention relates to wireless communications, and more particularly, to a method and apparatus for providing multimedia broadcast multicast services (MBMS) service for a low complexity user equipment (UE) in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

The 3GPP LTE can provide a multimedia broadcast multicast service (MBMS) service. The MBMS is a service which simultaneously transmits data packets to multiple users. If a specific level of users exists in the same cell, the respective users can be allowed to share necessary resources so that the plurality of users can receive the same multimedia data, thereby increasing resource efficiency. In addition, a multimedia service can be used with a low cost from the perspective of users.

In the future versions of the LTE-A, it has been considered to configure low-cost/low-end (or, low-complexity) user equipments (UEs) focusing on the data communication, such as meter reading, water level measurement, use of security camera, vending machine inventory report, etc. For convenience, these UEs may be called machine type communication (MTC) UEs. Since MTC UEs have small amount of transmission data and have occasional uplink data transmission/downlink data reception, it is efficient to reduce the cost and battery consumption of the UE according to a low data rate. Specifically, the cost and battery consumption of the UE may be reduced by decreasing radio frequency (RF)/baseband complexity of the MTC UE significantly by making the operating frequency bandwidth of the MTC UE smaller.

A method for providing MBMS service for a low complexity UE may be required.

SUMMARY OF THE INVENTION

The present invention provides a method and apparatus for providing multimedia broadcast multicast services (MBMS) service for a low complexity user equipment (UE) in a wireless communication system. The present invention provides mechanisms to support MBMS for a low complexity UE which may be able to support only smaller bandwidth than a system bandwidth. Furthermore, the present invention provides mechanisms to enhance coverage level such as via repetition and power boosting.

In an aspect, a method for receiving, by a user equipment (UE) requiring coverage enhancement, a multimedia broadcast multicast service (MBMS) service in a wireless communication system is provided. The method includes receiving information on repetition for coverage enhancement, and receiving the MBMS service according to the information repetition for coverage enhancement.

In another aspect, a method for providing, by a base station (BS), a multimedia broadcast multicast service (MBMS) service in a wireless communication system is provided. The method includes multiplexing a subband physical multicast channel (PMCH) with a physical downlink shared channel (PDSCH) in a subframe, and transmitting the MBMS service to a user equipment (UE) requiring coverage enhancement (CE) in the subframe. The subband PMCH is a PMCH allocated to a smaller bandwidth than a system bandwidth for the UE requiring CE.

A low complexity user equipment (UE) can support multimedia broadcast multicast services (MBMS) service efficiently.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTEadvance (LTE-A) is an evolution of the 3GPP LTE. For clarity, this application focuses on the 3GPP LTE/LTE-A. However, technical features of the present invention are not limited thereto.

Figure 1:
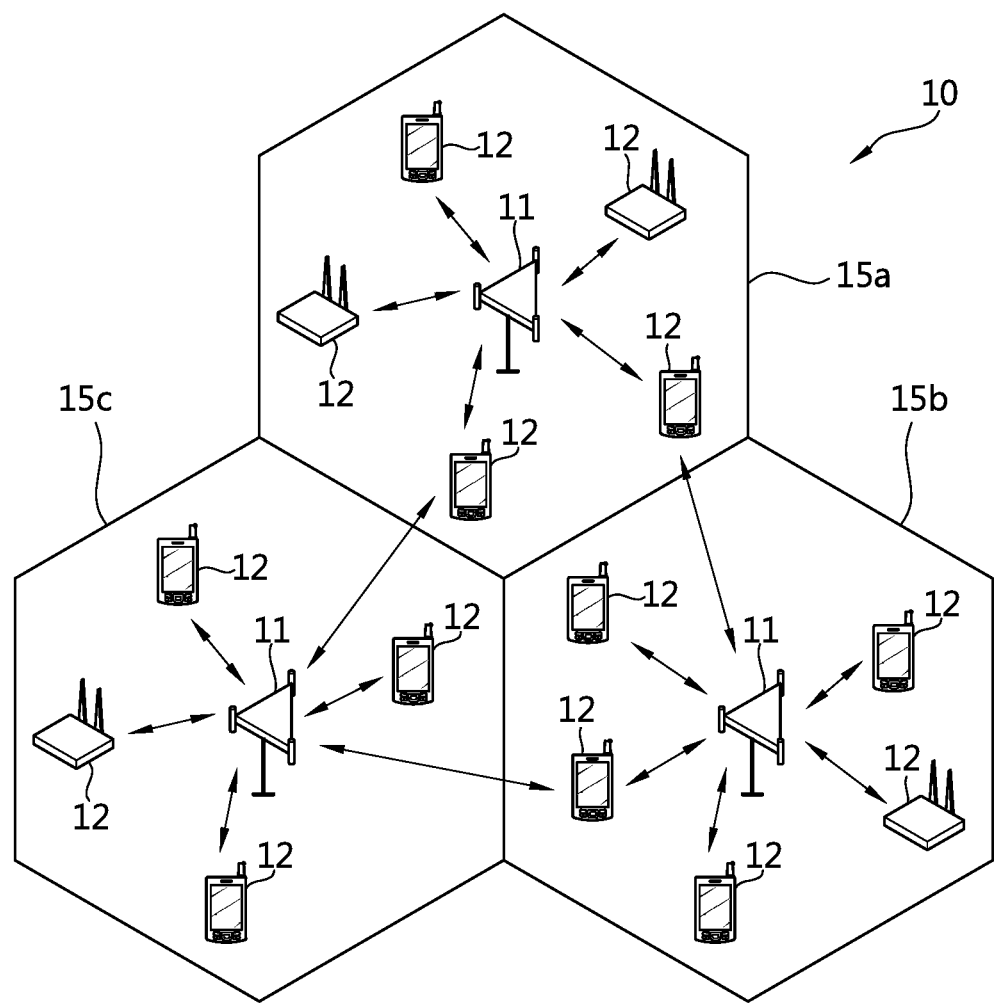
FIG. 1 shows a wireless communication system.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

Figure 2:
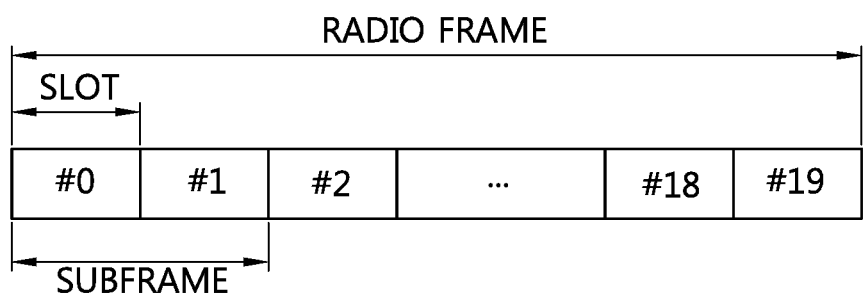
FIG. 2 shows structure of a radio frame of 3GPP LTE.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

Figure 3:
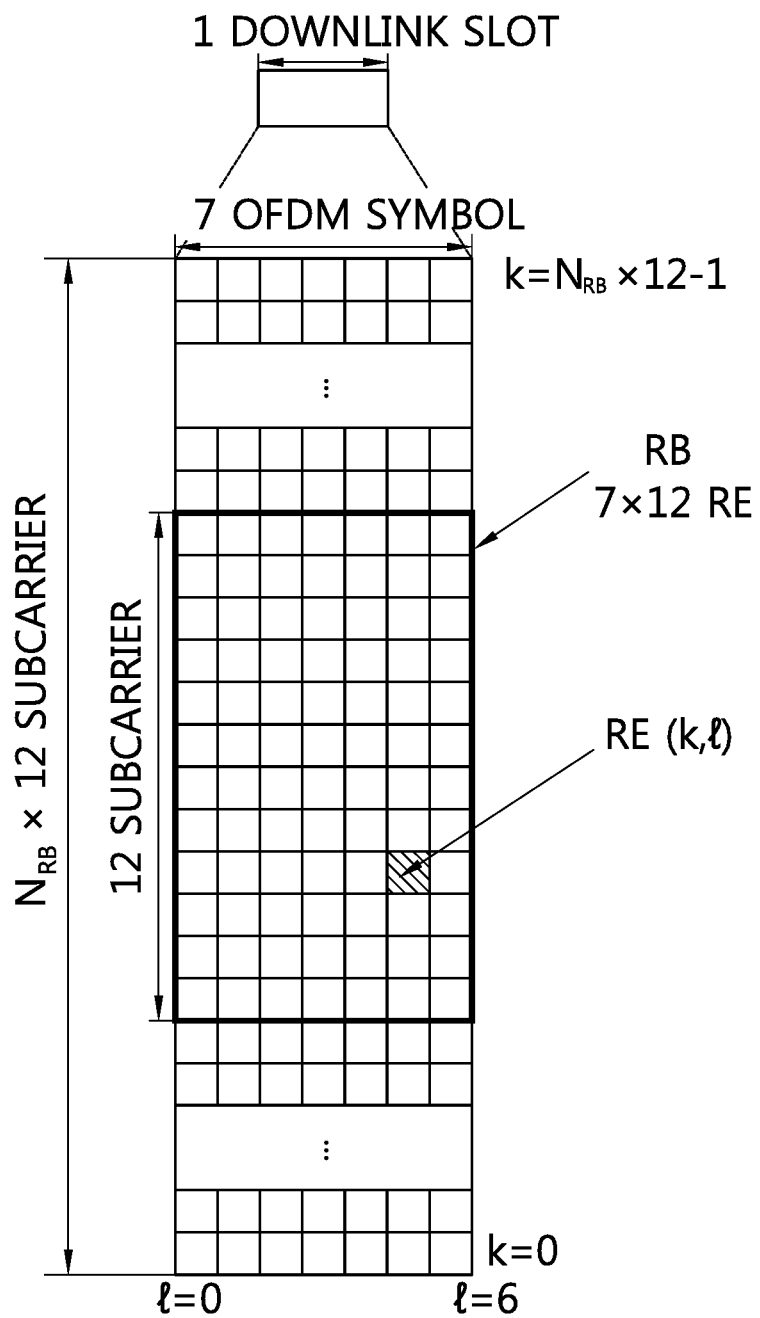
FIG. 3 shows a resource grid for one downlink slot.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

Figure 4:
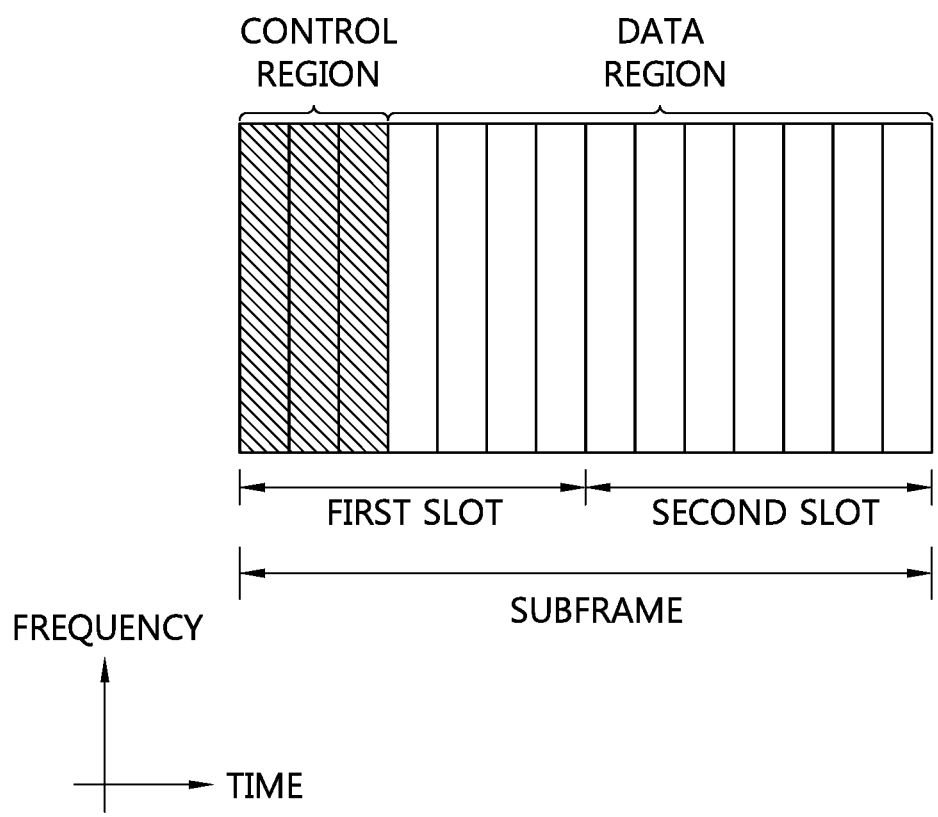
FIG. 4 shows structure of a downlink subframe.

FIG. 4 shows structure of a downlink subframe. Referring to FIG. 4, a maximum of three OFDM symbols located in a front portion of a first slot within a subframe correspond to a control region to be assigned with a control channel The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (TX) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of TX power control commands on individual UEs within an arbitrary UE group, a TX power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

Figure 5:
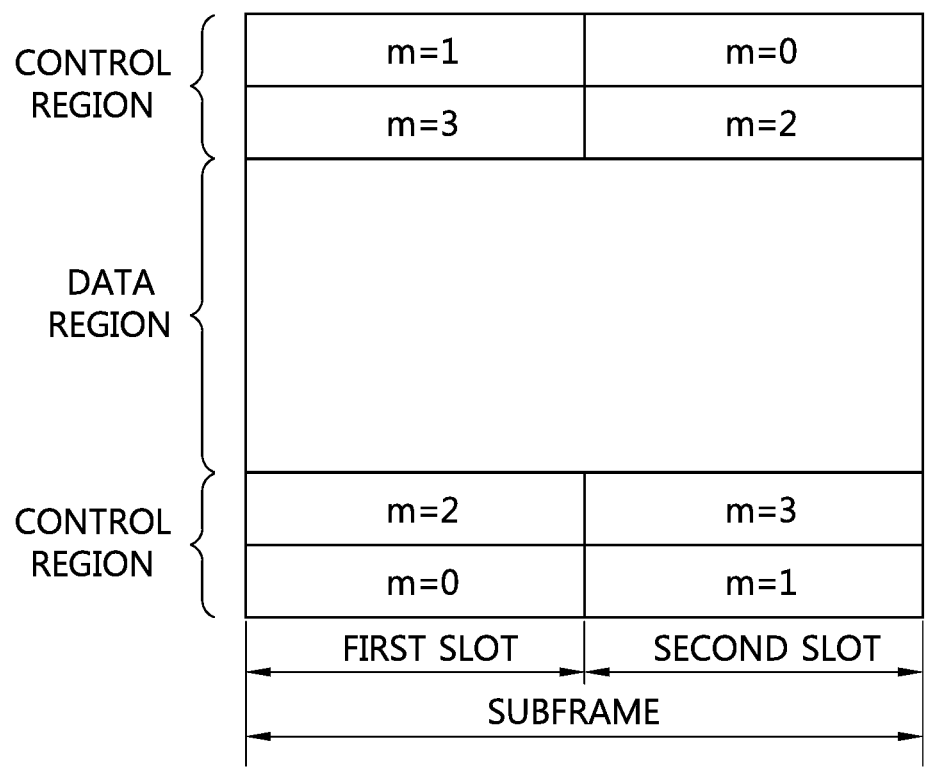
FIG. 5 shows structure of an uplink subframe.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Multimedia broadcast multicast service (MBMS) is described. It may be referred to Section 15 of 3GPP TS 36.300 V11.7.0 (2013-09) and Section 5.8 of 3GPP TS 36.331 V11.5.0 (2013-09).

Figure 6:
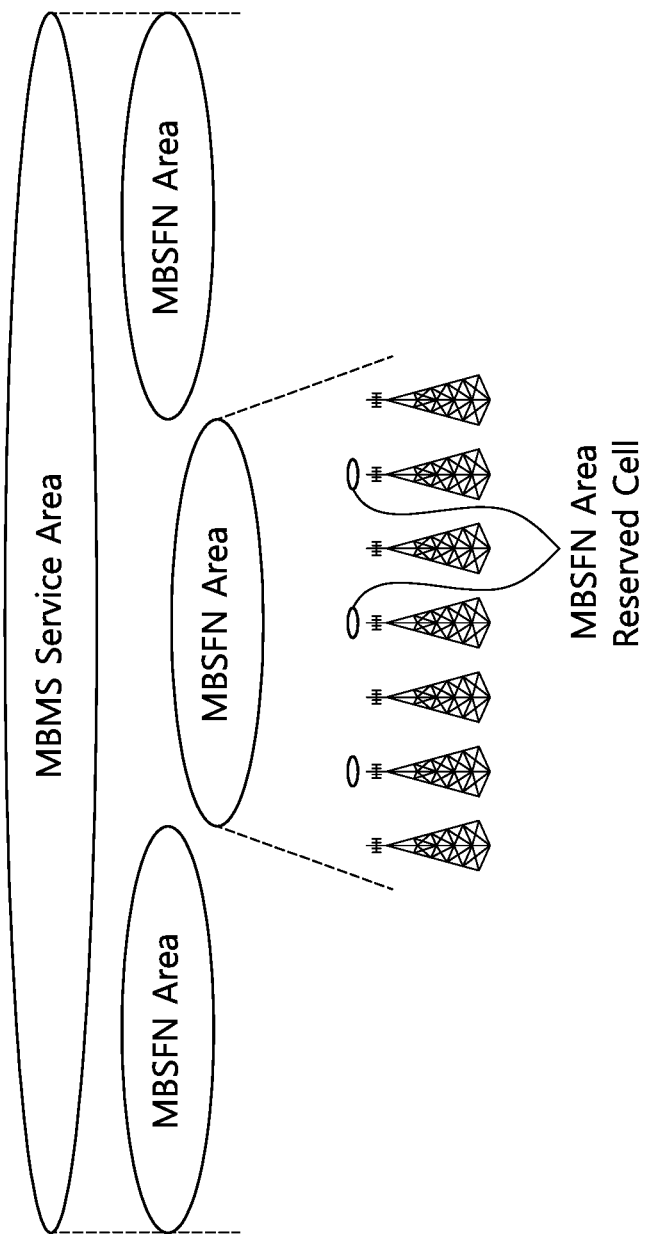
FIG. 6 shows MBMS definitions.

FIG. 6 shows MBMS definitions. For MBMS, the following definitions may be introduced.

Multicast-broadcast single-frequency network (MBSFN) synchronization area: This is an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas.

MBSFN transmission or a transmission in MBSFN mode: This is a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive.

MBSFN area reserved cell: This is a cell within a MBSFN area which does not contribute to the MBSFN transmission. The cell may be allowed to transmit for other services but at restricted power on the resource allocated for the MBSFN transmission.

Synchronization sequence: Each synchronization protocol data unit (SYNC PDU) contains a time stamp which indicates the start time of the synchronization sequence. For an MBMS service, each synchronization sequence has the same duration which is configured in the broadcast and multicast service center (BM-SC) and the multi-cell/multicast coordination entity (MCE).

Synchronization period: The synchronization period provides the time reference for the indication of the start time of each synchronization sequence. The time stamp which is provided in each SYNC PDU is a relative value which refers to the start time of the synchronization period. The duration of the synchronization period is configurable.

The following principles govern the multicast control channel (MCCH) structure:

One MBSFN area is associated with one MCCH and one MCCH corresponds to one MBSFN area;

The MCCH is sent on MCH;

MCCH consists of a single MBSFN area configuration RRC message which lists all the MBMS services with ongoing sessions and an optional MBMS counting request message;

MCCH is transmitted by all cells within an MBSFN area, except the MBSFN area reserved cells;

MCCH is transmitted by RRC every MCCH repetition period;

MCCH uses a modification period;

A notification mechanism is used to announce changes of MCCH due to either session start or the presence of an MBMS counting request message: The notification is sent periodically throughout the modification period preceding the change of MCCH, in MBSFN subframes configured for notification. The downlink control information (DCI) format 1C with MBMS radio network temporary identity (M-RNTI) is used for notification and includes an 8-bit bitmap to indicate the one or more MBSFN area(s) in which the MCCH change(s). The UE monitors more than one notification subframe per modification period. When the UE receives a notification, it acquires the MCCH at the next modification period boundary;

The UE detects changes to MCCH which are not announced by the notification mechanism by MCCH monitoring at the modification period.

In general, the control information relevant only for UEs supporting MBMS is separated as much as possible from unicast control information. Most of the MBMS control information is provided on a logical channel specific for MBMS common control information, i.e. the MCCH. E-UTRA employs one MCCH logical channel per MBSFN area. In case the network configures multiple MBSFN areas, the UE acquires the MBMS control information from the MCCHs that are configured to identify if services it is interested to receive are ongoing. The action applicable when the UE is unable to simultaneously receive MBMS and unicast services is up to UE implementation. An MBMS capable UE may only be required to support reception of a single MBMS service at a time, and reception of more than one MBMS service (also possibly on more than one MBSFN area) in parallel is left for UE implementation. The MCCH carries the MBSFNAreaConfiguration message, which indicates the MBMS sessions that are ongoing as well as the (corresponding) radio resource configuration. The MCCH may also carry the MBMSCountingRequest message, when E-UTRAN wishes to count the number of UEs in RRC_CONNECTED that are receiving or interested to receive one or more specific MBMS services.

A limited amount of MBMS control information is provided on the broadcast control channel (BCCH). This primarily concerns the information needed to acquire the MCCH(s). This information is carried by means of a single MBMS specific SystemInformationBlock, i.e. SystemInformationBlockType13. An MBSFN area is identified solely by the mbsfn-AreaId in SystemInformationBlockType13. At mobility, the UE considers that the MBSFN area is continuous when the source cell and the target cell broadcast the same value in the mbsfn-AreaId.

The MCCH information is transmitted periodically, using a configurable repetition period. Scheduling information is not provided for MCCH, i.e. both the time domain scheduling as well as the lower layer configuration are semi-statically configured, as defined within SystemInformationBlockType13.

For MBMS user data, which is carried by the multicast traffic channel (MTCH) logical channel, E-UTRAN periodically provides multicast channel (MCH) scheduling information (MSI) at lower layers (MAC). This MCH information only concerns the time domain scheduling, i.e. the frequency domain scheduling and the lower layer configuration are semi-statically configured. The periodicity of the MSI is configurable and defined by the MCH scheduling period.

Change of MCCH information only occurs at specific radio frames, i.e. the concept of a modification period is used. Within a modification period, the same MCCH information may be transmitted a number of times, as defined by its scheduling (which is based on a repetition period). The modification period boundaries are defined by SFN values for which SFN mod m=0, where m is the number of radio frames comprising the modification period. The modification period is configured by means of SystemInformationBlockType13.

Figure 7:
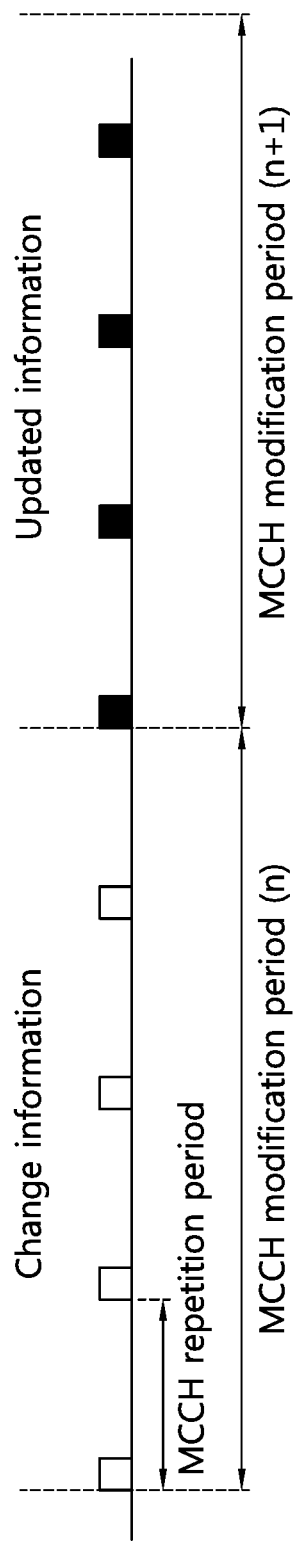
FIG. 7 shows change of MCCH information.

FIG. 7 shows change of MCCH information. When the network changes (some of) the MCCH information, it notifies the UEs about the change during a first modification period. In the next modification period, the network transmits the updated MCCH information. In FIG. 7, different colors indicate different MCCH information. Upon receiving a change notification, a UE interested to receive MBMS services acquires the new MCCH information immediately from the start of the next modification period. The UE applies the previously acquired MCCH information until the UE acquires the new MCCH information.

Indication of an MBMS specific RNTI, the M-RNTI, on PDCCH is used to inform UEs in RRC_IDLE and UEs in RRC_CONNECTED about an MCCH information change. When receiving an MCCH information change notification, the UE knows that the MCCH information will change at the next modification period boundary. The notification on PDCCH indicates which of the MCCHs will change, which is done by means of an 8-bit bitmap. Within this bitmap, the bit at the position indicated by the field notificationIndicator is used to indicate changes for that MBSFN area. If the bit is set to "1", the corresponding MCCH will change. No further details are provided, e.g. regarding which MCCH information will change. The MCCH information change notification is used to inform the UE about a change of MCCH information upon session start or about the start of MBMS counting.

The MCCH information change notifications on PDCCH are transmitted periodically and are carried on MBSFN subframes only. These MCCH information change notification occasions are common for all MCCHs that are configured, and configurable by parameters included in SystemInformationBlockType13, i.e. a repetition coefficient, a radio frame offset and a subframe index. These common notification occasions are based on the MCCH with the shortest modification period.

E-UTRAN may modify the MBMS configuration information provided on MCCH at the same time as updating the MBMS configuration information carried on BCCH, i.e. at a coinciding BCCH and MCCH modification period. Upon detecting that a new MCCH is configured on BCCH, a UE interested to receive one or more MBMS services should acquire the MCCH, unless it knows that the services it is interested in are not provided by the corresponding MBSFN area.

A UE that is receiving an MBMS service shall acquire the MCCH information from the start of each modification period. A UE that is not receiving an MBMS service, as well as UEs that are receiving an MBMS service but potentially interested to receive other services not started yet in another MBSFN area, shall verify that the stored MCCH information remains valid by attempting to find the MCCH information change notification at least notificationRepetitionCoeff times during the modification period of the applicable MCCH(s), if no MCCH information change notification is received.

In case the UE is aware which MCCH(s) E-UTRAN uses for the service(s) it is interested to receive, the UE may only need to monitor change notifications for a subset of the MCCHs that are configured, referred to as the 'applicable MCCH(s)' in the above.

MCCH information acquisition procedure is described. The UE applies the MCCH information acquisition procedure to acquire the MBMS control information that is broadcasted by the E-UTRAN. The procedure applies to MBMS capable UEs that are in RRC_IDLE or in RRC_CONNECTED.

A UE interested to receive MBMS services shall apply the MCCH information acquisition procedure upon entering the corresponding MBSFN area (e.g. upon power on, following UE mobility) and upon receiving a notification that the MCCH information has changed. A UE that is receiving an MBMS service shall apply the MCCH information acquisition procedure to acquire the MCCH, which corresponds with the service that is being received, at the start of each modification period.

Unless explicitly stated otherwise, the MCCH information acquisition procedure overwrites any stored MCCH information, i.e. delta configuration is not applicable for MCCH information and the UE discontinues using a field if it is absent in MCCH information unless explicitly specified otherwise.

Figure 8:
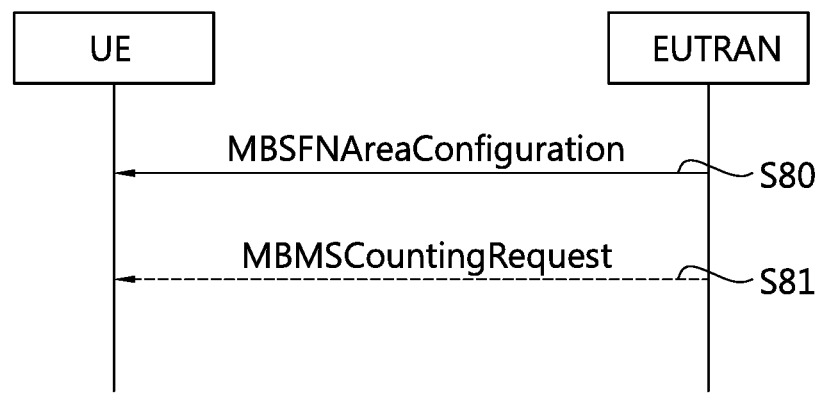
FIG. 8 shows a MCCH information acquisition procedure.

FIG. 8 shows a MCCH information acquisition procedure. An MBMS capable UE shall:

1>if the procedure is triggered by an MCCH information change notification:

2>start acquiring the MBSFNAreaConfiguration message (in step S80) and the MBMSCountingRequest message if present (in step S81), from the beginning of the modification period following the one in which the change notification was received;

1>if the UE enters an MBSFN area:

2>acquire the MBSFNAreaConfiguration message (in step S90) and the MBMSCountingRequest message if present (in step S91), at the next repetition period;

1>if the UE is receiving an MBMS service:

2>start acquiring the MBSFNAreaConfiguration message (in step S80) and the MBMSCountingRequest message if present (in step S81), that both concern the MB SFN area of the service that is being received, from the beginning of each modification period;

Upon receiving MBMSCountingRequest message, the UE shall perform the MBMS counting procedure.

Table 1 shows SystemInformationBlockType13. The IE SystemInformationBlockType13 contains the information required to acquire the MBMS control information associated with one or more MBSFN areas.

TABLE 1

```
-- ASN1START
SystemInformationBlockType13-r9 ::= SEQUENCE {
    mbsfn-AreaInfoList-r9       MBSFN-AreaInfoList-r9,
    notificationConfig-r9       MBMS-NotificationConfig-r9,
    lateNonCriticalExtension    OCTET STRING
  OPTIONAL, -- Need OP
    ...
}
-- ASN1STOP
```

Table 2 shows MBSFN-AreaInfoList, which is included in SystemInformationBlockType13. The IE MBSFN-AreaInfoList contains the information required to acquire the MBMS control information associated with one or more MBSFN areas.

TABLE 2

```
-- ASN1START
MBSFN-AreaInfoList-r9 ::= SEQUENCE (SIZE(1..maxMBSFN-Area))
  OF MBSFN-AreaInfo-r9
MBSFN-AreaInfo-r9 ::= SEQUENCE {
    mbsfn-AreaId-r9              INTEGER (0..255),
    non-MBSFNregionLength        ENUMERATED {s1, s2},
    notificationIndicator-r9   INTEGER (0..7),
    mcch-Config-r9               SEQUENCE {
      mcch-RepetitionPeriod-r9       ENUMERATED {rf32, rf64, rf128, rf256},
      mcch-Offset-r9                 INTEGER (0..10),
      mcch-ModificationPeriod-r9     ENUMERATED {rf512, rf1024},
      sf-AllocInfo-r9                BIT STRING (SIZE(6)),
      signallingMCS-r9               ENUMERATED {n2, n7, n13, n19}
    },
    ...
}
-- ASN1STOP
```

Referring to Table 2, the MBSFN-AreaInfoList includes the MBSFN-AreaInfo IE. In the MBSFN-AreaInfo IE, the mbsfn-AreaId field indicates the MBSFN area identifier (ID). The non-MBSFNregionLength field indicates how many symbols from the beginning of the subframe constitute the non-MBSFN region. This value applies in all subframes of the MBSFN area used for PMCH transmissions as indicated in the MSI. The notificationIndicator field indicates which PDCCH bit is used to notify the UE about change of the MCCH applicable for this MBSFN area.

Further, the MBSFN-AreaInfo IE includes the mcch-Config IE. In the mcch-Config IE, the mcch-RepetitionPeriod field defines the interval between transmissions of MCCH information, in radio frames. The mcch-Offset field indicates, together with the mcch-RepetitionPeriod, the radio frames in which MCCH is scheduled, i.e. MCCH is scheduled in radio frames for which: SFN mod mcch-RepetitionPeriod=mcch-Offset. The mcch-ModificationPeriod field defines periodically appearing boundaries, i.e. radio frames for which SFN mod mcch-ModificationPeriod=0. The contents of different transmissions of MCCH information can only be different if there is at least one such boundary in-between them. The sf-AllocInfo field indicates the subframes of the radio frames indicated by the mcch-RepetitionPeriod and the mcch-Offset, which may carry MCCH. The signalingMCS field indicates the modulation and coding scheme (MCS) applicable for the subframes indicated by the field sf-AllocInfo and for each (P)MCH that is configured for this MBSFN area, for the first subframe allocated to the (P)MCH within each MCH scheduling period (which may contain the MCH scheduling information provided by MAC).

Table 3 shows the MBSFNAreaConfiguration message. The MBSFNAreaConfiguration message contains the MBMS control information applicable for an MBSFN area. E-UTRAN configures an MCCH for each MBSFN area, i.e. the MCCH identifies the MBSFN area.

TABLE 3

```
-- ASN1START
MBSFNAreaConfiguration-r9 ::= SEQUENCE {
    commonSF-Alloc-r9          CommonSF-AllocPatternList-r9,
    commonSF-AllocPeriod-r9    ENUMERATED {rf4, rf8, rf16, rf32, rf64, rf128, rf256},
    pmch-InfoList-r9           PMCH-InfoList-r9,
    nonCriticalExtension       MBSFNAreaConfiguration-v930-IEs
OPTIONAL -- Need OP
}
MBSFNAreaConfiguration-v930-IEs ::= SEQUENCE {
    lateNonCriticalExtension   OCTET STRING
OPTIONAL, -- Need OP
    nonCriticalExtension       SEQUENCE { }
OPTIONAL -- Need OP
}
CommonSF-AllocPatternList-r9 ::= SEQUENCE (SIZE
(1..maxMBSFN-Allocations)) OF MBSFN-SubframeConfig
-- ASN1STOP
```

Table 4 shows the PMCH-InfoList information element (IE) included in the MBSFNAreaConfiguration message. The IE PMCH-InfoList specifies configuration of all physical multicast channels (PMCHs) of an MBSFN area. The information provided for an individual PMCH includes the configuration parameters of the sessions that are carried by the concerned PMCH.

TABLE 4

```
-- ASN1START
PMCH-InfoList-r9 ::= SEQUENCE (SIZE
(0..maxPMCH-PerMBSFN)) OF PMCH-Info-r9
PMCH-Info-r9 ::= SEQUENCE {
    pmch-Config-r9             PMCH-Config-r9,
    mbms-SessionInfoList-r9    MBMS-SessionInfoList-r9,
    ...
}
MBMS-SessionInfoList-r9 ::= SEQUENCE (SIZE
(0..maxSessionPerPMCH)) OF MBMS-SessionInfo-r9
MBMS-SessionInfo-r9 ::= SEQUENCE {
    tmgi-r9                    TMGI-r9,
    sessionId-r9               OCTET STRING (SIZE (1))
OPTIONAL, -- Need OR
    logicalChannelIdentity-r9  INTEGER (0..maxSessionPerPMCH-1),
    ...
}
PMCH-Config-r9 ::= SEQUENCE {
    sf-AllocEnd-r9             INTEGER (0..1535),
    dataMCS-r9                 INTEGER (0..28),
    mch-SchedulingPeriod-r9    ENUMERATED {
                                   rf8, rf16, rf32, rf64, rf128,
                                   rf256, rf512, rf1024},
    ...
}
TMGI-r9 ::= SEQUENCE {
    plmn-Id-r9      CHOICE {
        plmn-Index-r9          INTEGER (1..maxPLMN-r11),
        explicitValue-r9       PLMN-Identity
    },
    serviceId-r9    OCTET STRING (SIZE (3))
}
-- ASN1STOP
```

Referring to Table 4, the sf-AllocEnd field indicates the last subframe allocated to this (P)MCH within a period identified by field commonSF-AllocPeriod. The subframes allocated to (P)MCH corresponding with the $n^{th}$ entry in pmch-InfoList are the subsequent subframes starting from either the next subframe after the subframe identified by sf-AllocEnd of the $(n-1)^{th}$ listed (P)MCH or, for n=1, the first subframe defined by field commonSF-Alloc, through the subframe identified by sf-AllocEnd of the $n^{th}$ listed (P)MCH. Value 0 corresponds with the first subframe defined by field commonSF-Alloc. The mch-SchedulingPeriod field indicates the MCH scheduling period, i.e. the periodicity used for providing MCH scheduling information at lower layers (MAC) applicable for an MCH. The mch-SchedulingPeriod starts in the radio frames for which: SFN mod mch-SchedulingPeriod=0. E-UTRAN configures mch-SchedulingPeriod of the (P)MCH listed first in PMCH-InfoList to be smaller than or equal to mcch-RepetitionPeriod.

In the current LTE specification, all UEs shall support maximum 20 MHz system bandwidth, which requires baseband processing capability to support 20 MHz bandwidth. To reduce hardware cost and battery power of the UE used for machine type communication (MTC), reducing bandwidth is a very attractive option. To enable narrow-band MTC UEs, the current LTE specification shall be changed to allow narrow-band UE category. If the serving cell has small system bandwidth (smaller than or equal to bandwidth that narrow-band UE can support), the UE can attach based on the current LTE specification.

It has been discussed providing MBMS service for low-complexity UE or MTC UE, i.e. UEs supporting smaller bandwidth. For those UEs accessing smaller data bandwidth than system bandwidth, handling of MBMS service may require some considerations. For example, MBMS can be transmitted in the entire system bandwidth currently, and is not allowed to be transmitted in a subset or subband.

Accordingly, in order to solve the problem described above, a method for providing MBMS service for a UE requiring coverage enhancement (CE) is proposed according to an embodiment of the present invention below. Hereinafter, a UE requiring CE may be referred to as one of a MTC UE, a low cost UE, a low end UE, a low complexity UE, a narrow(er) band UE, a small(er) band UE, or a new category UE. Or, just a UE may refer one of UEs described above. In the description below, a case where system bandwidth of available cells is larger than bandwidth that new category narrow-band UEs can support may be assumed. For the new category UE, it may be assumed that only one narrow-band is defined. In other words, all narrow-band UE shall support the same narrow bandwidth smaller than 20 MHz. It may be assumed that the narrow bandwidth is larger than 1.4 MHz (6 PRBs). However, the present invention can be applied to narrower bandwidth less than 1.4 MHz as well (e.g. 200 kHz), without loss of generality. Furthermore, in terms of UL transmission, a UE may be configured or scheduled with single or less than 12 tones (i.e. subcarriers) in one UL transmission to enhance the coverage by improving peak-to-average power ratio (PAPR) and channel estimation performance.

To support MBMS services, at least one of following options may be considered.

Since MBMS reception is optional feature, a UE should be able to access the wideband (system bandwidth) to support MBMS. In other words, a UE should be able to access the entire system bandwidth for MBMS reception. To minimize the required hardware complexity, limiting MBMS transmission utilizing quadrature phase shift keying (QPSK)/16 quadrature amplitude modulation (QAM) only may be further considered (i.e. disable 64/25 6 QAM transmission in MBMS). If this option is employed, and if a UE supports MBMS, it may also support wideband data reception for unicast as well. Thus, the UE may signal the capability of accessibility on wideband via capability signaling. For those UEs, the network may assume that frequency retuning latency is zero, and thus, frequency retuning may occur in each subframe if needed. In other words, those UEs may be assumed to be able to access wideband at least from RF perspective even though baseband processing capability is limited to small bandwidth.

MBMS (or MBSFN-area) configuration may be specified in a subband which can be readable by a low complexity UE. To support this, MBSFN-area supported for a low complexity UE may include subband location where MBMS is transmitted. If MBMS for such a UE is transmitted via center 6 PRB only, the frequency location may not be specified. Instead, a low complexity UE may acquire MBMS related information from low-complexity UE-dedicated SIB.

In case MBMS supports also coverage enhancement via repetition or power boosting, the information on coverage enhancement may also be informed to the UE. There may be several options to configure information on coverage enhancements or repetition as follows.

Repetition number may be added in MBSFN-AreaInfo for MTCH. The repetition number may be used as a repetition number for each PMCH (MTCH). Table 5 shows the MBSFN-AreaInfo IE according to an embodiment of the present invention.

relaxed such that sufficient repetition can be placed within one MCCH modification period.

For PMCH, large mch-SchedulingPeriod (such as Rf10240) may be considered. Further, sf-AllocEnd may have a big gap between n-th PMCH-config and (n+1)-th PMCH-config. This is similar to MCCH case where larger periodicity is used and thus allow more repetition within one period, which is described above. Since MBSFN subframes within sf-AllocEnd of n-th PMCH-config+1 and sf-AllocEnd of (n+1)-th PMCH-config are used for MBMS transmission for (n+1)-th PMCH-config, by having a large gap, the repetition may be used. However, this approach may require expanding sf-AllocEnd to a larger number to accommodate potentially multiple PMCH-config with repetitions.

If this approach is used, it is however specified that a UE may assume the same content is delivered in all subframes at each time. In other words, between sf-AllocEnd of n-th PMCH-config+1 and sf-AllocEnd of (n+1)-th PMCH-config, a UE requiring CE may assume that the same content is delivered via repetition. In other words, a UE not requiring CE may read only a few PMCHs within the duration of (n+1)-th PMCH-config transmission. In the next round, the content may be changed. With this mechanism, overall data rate of MBMS service may be very limited which may be also impacted by the number of PMCH-config. In this case, whether the same data is repeated within one round or not

TABLE 5

```
MBSFN-AreaInfo-r9 ::= SEQUENCE {
    mbsfn-AreaId-r9         INTEGER (0..255),
    non-MBSFNregionLength   ENUMERATED {s1, s2},
    notificationIndicator-r9 INTEGER (0..7),
    repetition-counter      ENUMERATED {sf100, sf200, sf300, sf400}
    mcch-Config-r9              SEQUENCE {
        mcch-RepetitionPeriod-r9    ENUMERATED {rf32, rf64, rf128, rf256},
        mcch-Offset-r9              INTEGER (0..10),
        mcch-ModificationPeriod-r9  ENUMERATED {rf512, rf1024},
        sf-AllocInfo-r9             BIT STRING (SIZE(6)),
        signallingMCS-r9            ENUMERATED {n2, n7, n13, n19}
    },
    ...
}
```

Referring to Table 5, the repetition-counter field is further added as compared with the MBSFN-AreaInfo IE in Table 2 shown above. The repetition-counter field indicates a repetition number for each PMCH (MTCH). SF100 may refer 100 times of repetition, SF 200 may refer 200 times of repetition, and so on. Depending on the repetition number indicated by the repetition-counter field, MCCH repetition period and MCCH modification period may change (such as MCCH repetition period=mcch-RepetitionPeriod*repetition-counter, MCCH modification period=mcch-ModificationPeriod*repetition-counter).

Alternatively, MCCH modification period (mcch-ModificationPeriod) may only be increased to incorporate repetition counter. For example, instead of rf512 of MCCH modification period, rf51200 of MCCH modification period may be used to reflect 100 times of repetition. In this case, since the same content will be transmitted within MCCH modification period per MCCH repetition period configuration, a UE may aggregate multiple MCCHs when coverage enhancement is needed. In other words, to support CE UEs requiring repetitions, modification periodicity may be needs to be specified in each PMCH-config if the same configuration is shared between MBMS for UEs with and without CE.

Alternatively, for PMCH, all configuration may be based on the prefixed or commonly-configured repetition counter 'm', such as all period/allocation are interpreted based on repetition counter m. For example, mch-SchedulingPeriod may be computed as mch-SchedulingPeriod*m (e.g. rf16=radio frame 16*m). To support this, a common parameter 'repetition counter' may be given for MBSFN configuration. It is noted that MBMS configuration for a low complexity UE is separate from MBMS configuration for legacy UEs. It is also considerable to configure a separate MBMS configuration between a low complexity UE not requiring CE and a UE requiring CE. Another approach is to configure a common 'm'—repetition number, and configure individual flag 'CE-enabled or not' per MBSFN-area and/or PMCH-config.

Alternatively, if a low complexity UE is configured with a subband to monitor, it may also be assumed that MBMS needs to be transmitted in that subband to be received. To support this approach, a separate SIB carrying MBMS-configuration per each subband may be considered. Each UE may attempt to read the SIB transmitted in the subband monitored/configured to the UE. Since SIB is transmitted per subband, MBMS configuration does not need to carry frequency location information. It may be assumed that MBMS will be transmitted in the entire subband (where SIB has been transmitted) per configuration. In other words, MBMS is maintained separately per subband (and thus, it works as if the system has multiple MBMS-dedicated small bandwidth carriers). Since some subband(s) may carry MBMS services whereas other subband(s) may not, it is also notable that if a low complexity UE is scheduled in a MBSFN-SF, it may assume that extended CP is used even for data transmission regardless of CP used in subframe #0.

Figure 9:
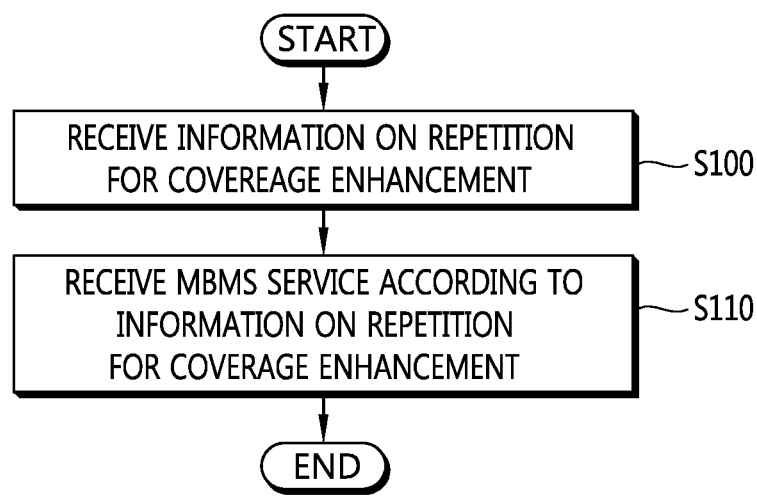
FIG. 9 shows a method for receiving a MBMS service according to an embodiment of the present invention.

FIG. 9 shows a method for receiving a MBMS service according to an embodiment of the present invention.

In step S100, the UE requiring CE receives information on repetition for coverage enhancement. The information on repetition for CE may correspond to a repetition number for each PMCH or MTCH. In this case, the repetition number is included in a MBSFN area information. This is described in Table 5 above. Alternatively, the information on repetition for CE may correspond to a MCCH modification period based on the repetition for coverage enhancement, which is larger than a MCCH modification period for a UE not requiring CE, to incorporate repetition counter. In this case, multiple MCCHs may be aggregated in the MCCH modification period based on the repetition for coverage enhancement. Alternatively, the information on repetition for CE may correspond to a MCH scheduling period based on the repetition for coverage enhancement, which is larger than a MCH scheduling period for a UE not requiring CE.

In step S110, the UE receives the MBMS service according to the information repetition for coverage enhancement.

Further, the UE may receive a system information block including a MBMS configuration per each subband. In this case, the MBMS service may be received per each subband.

Multiplexing MBMS subband with other transmission according to an embodiment of the present invention is described. When only some subbands are used for MBMS transmission, how to utilize the remaining RBs/resources, which are not used for MBMS transmission, needs to be clarified. For this, at least one of followings may be considered.

(1) Only one subband where PMCH transmission occurs for low complexity UE(s) may be utilized and other subbands/resources may not be utilized. In other words, neither MBMS for legacy UEs and low complexity UEs nor any unicast and MBMS for low complexity UEs may be multiplexed within a subframe. If this approach is used, power boosting on MBSFN reference signal (RS) and PMCH may be assumed. However, this option may be left to network implementation. If this approach is used, subband location of PMCH-config or MBSFN-area configuration may be given as a common-parameter rather than per MBSFN-area or PMCH-config. MBSFN-RS creation may be done assuming the system bandwidth is small (e.g. 6 PRBs if the narrow-band low complexity UE can read only 6 PRBs). In other words, since only one PMCH can be transmitted in a subframe where the PMCH bandwidth is small, MBSFN-RS may be generated assuming small bandwidth as well.

(2) Alternatively, subband-PMCHs (i.e. PMCH transmission over small bandwidth (or subband) of multiple PMCH-configs may be multiplexed. If this approach is used, frequency location per PMCH-config may be separately configured. MTCH and MCCH may not be multiplexed together in a subframe for the simplicity. When two are scheduled in the same subframe, the UE may skip decoding of MCCH in the subframe. If this approach is used, MBSFN-RS creation may be based on small bandwidth (subband bandwidth) or system bandwidth.

(3) Alternatively, subband-PMCH(s) and PDSCH may be multiplexed in a subframe. There are two potential reasons to allow this approach. One reason is that MBMS for a low complexity UE may not be configured in MBSFN-subframes configured for legacy UEs. Since configuring MBSFN subframes may restrict or affect system spectral efficiency (as a legacy UE not configured with transmission mode (TM) 9/10 may not be scheduled in MBSFN subframes), it is not desirable to configure many MBSFN subframes. Thus, one possibility is to utilize normal subframe to transmit subband-PMCH for a low complexity UE. The other reason is that since there is a large population of low complexity UEs, it is generally desirable to allow multiplexing of multicast/broadcast and unicast in a subframe via frequency division multiplexing (FDM). Thus, multiplexing between unicast and MBMS may be considered. In this case, MBMS transmission for a low complexity UE may be as follows.

CP configuration used in normal subframe may be used.
　　Low complexity UE MBMS configuration may not assume MBSFN subframe configurations.
　　It may assume that one PMCH-config may not be transmitted in both normal and MBSFN subframes. That is, either CP may be configured per PMCH-config and/or MBSFN-area config or a common CP may be configured which are commonly used for all MBMS configurations.
　　Either demodulation reference signal (DM-RS) or a new MBSFN-RS in normal CP may be considered. DM-RS may be pre-fixed, which may be used for cell-common control channels, e.g., enhanced PDCCH (EPDCCH) cell-specific search space (CSS) or preconfigured as a common parameter in SIB for MBMS reception. Alternatively, CRS may be used for MBMS reception. Either DM-RS or CRS is used, the cell ID/scrambling ID used for scrambling RS for MBMS transmission may be configured per each MBSFN-area and/or PMCH-config. Another option is to use positioning reference signal (PRS) RE pattern for RS used for MBMS.
　　Since the MBMS service can be transmitted in normal subframe, the UE may assume that CRS is always transmitted in a subframe configured for MBMS-config if this approach is used. If MBMS is transmitted in MBSFN subframe, regardless of actual CRS transmission, the UE should assume CRS transmission from collaborating cells. For this, a UE may be configured with a set of cell ID which participates transmission of the PMCH. Alternatively, since a UE requiring CE is in noise-limited environment rather than interference-limited environment, only the serving cell's CRS may be assumed for data rate-matching. Or, if single cell MBMS is used, only one cell ID may be assumed for data rate-matching.

Figure 10:
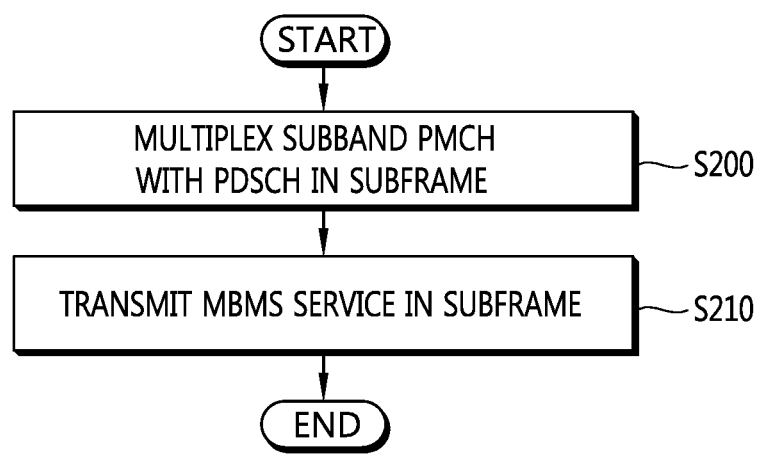
FIG. 10 shows a method for providing a MBMS service according to an embodiment of the present invention.

FIG. 10 shows a method for providing a MBMS service according to an embodiment of the present invention. This embodiment may implement option (3) described above.

In step S200, the base station multiplexes a subband PMCH with a PDSCH in a subframe. The subband PMCH is a PMCH allocated to a smaller bandwidth than a system bandwidth for the UE requiring CE. The subframe may be a normal subframe. The subband PMCH and the PDSCH may be multiplexed by a FDM.

In step S210, the base station transmits the MBMS service to a UE requiring CE in the subframe.

Further, the base station may transmit a DM-RS or a CRS for transmitting the MBMS service to the UE requiring CE. The base station may further configure a cell ID or a scrambling ID for scrambling the DM-RS or the CRS. The cell ID or the scrambling ID may be configured per each MBSFN area or per each PMCH configuration.

(4) Alternatively, since option (3) described above cause some issues regarding CRS transmission, MBMS transmission and unicast transmission may be multiplexed only in MBSFN subframes. Since unicast transmission even in MBSFN subframe follows CP configuration for subframe #0, this approach may work as follows.

Normal CP may be used for MBMS transmission: If this approach is used, CP of MBMS may be configured per PMCH-config and/or MBSFN-area config or commonly configured for MBMS or follow configuration used in subframe #0. As described in option (3) above, there may be a few choices of RS used for MBMS transmission.

Unicast multiplexed with MBMS in a MB SFN subframe may utilize only extended CP: If this is used, only advanced UEs may be multiplexed with subband-PMCH Subband MBMS+extended CP MTC PCCCH (M-PDCCH)/PDSCH for advanced UEs (e.g. enhanced MTC (eMTC) UEs or rel-13/14 UEs)

However, different mechanism(s) may be used for MBMS service for a low complexity UE not requiring CE and a UE requiring CE respectively. For example, for a low complexity UE not requiring CE, MBMS may be multiplexed with unicast transmission, whereas for the UE requiring CE, MBMS may be configured without assuming any multiplexing with unicast transmission. In other words, different mechanisms and configurations may be given per MBMS service (or PMCH-config) depending on the capabilities of recipients/group members.

Single cell multicast for UEs requiring CE according to an embodiment of the present invention is described. A UE may assume that the system may not support MBMS for a UE requiring CE. However, it may be up to UE implementation to attempt to acquire MBMS configured for a low complexity UE not requiring CE. For a UE requiring CE, single cell MBMS transmission may be considered where a new SIB may be defined to propagate the information of such MBMS configurations. The information may include period and subframes where MBMS transmission will occur. The information may also configure RNTI used for MBMS transmission. A separate RNTI may be configured per each MBMS service and/or per PMCH-config. A UE interested in the service may decode data per configuration.

Different from normal MBMS, it may be transmitted via PDSCH instead of PMCH. One simple approach may be to propagate a set of semi-persistent scheduling (SPS) PDSCH transmission in a SIB which include a period where SPS PDSCH transmission starts, an offset to indicate the first radio frame or subframe where SPS PDSCH transmission starts, a RNTI which is used for cyclic redundancy check (CRC), a repetition number which indicates the number of repetition, an set of subframes used for repetition (if not prefixed). When this approach is used, a UE may not assume that HARQ-ACK feedback needs to be transmitted.

Figure 11:
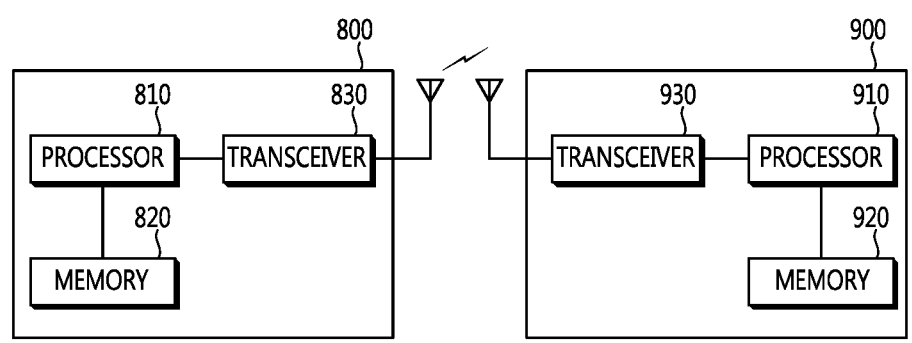
FIG. 11 shows a wireless communication system to implement an embodiment of the present invention.

FIG. 11 shows a wireless communication system to implement an embodiment of the present invention.

A BS 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) requiring coverage enhancement in a wireless communication system, the method comprising:

receiving information on repetition for coverage enhancement, wherein the information on repetition for coverage enhancement includes a repetition number for multicast traffic channel (MTCH), wherein the information on repetition for coverage enhancement informs the UE of a first multicast control channel (MCCH) modification period;

aggregating multiple MCCHs in the first MCCH modification period based on the information on repetition for coverage enhancement; and receiving a multimedia broadcast multicast service (MBMS) service during the first MCCH modification period based on the repetition number in the information on the repetition for coverage enhancement, wherein the first MCCH modification period is larger than a second MCCH modification period which is for a UE not requiring coverage enhancement.

2. The method of claim 1, wherein the repetition number is included in multicast-broadcast single-frequency network (MBSFN) area information.

3. The method of claim 1, wherein the information on repetition for coverage enhancement corresponds to a multicast channel (MCH) scheduling period based on the repetition for coverage enhancement, which is larger than a MCH scheduling period for a UE not requiring CE.

4. The method of claim 1, further comprising receiving a system information block including a MBMS configuration per subband.

5. The method of claim 4, wherein the MBMS service is received per subband.

6. A user equipment (UE) in a wireless communication system, the UE comprising:
a memory;
a transceiver; and
a processor, operably coupled to the memory and the transceiver, and configured to:
control the transceiver to receive information on repetition for coverage enhancement, wherein the information on repetition for coverage enhancement includes a repetition number for multicast traffic channel (MTCH), wherein the information on repetition for coverage enhancement informs the UE of a first multicast control channel (MCCH) modification period;
aggregate multiple MCCHs in the first MCCH modification period based on the information on repetition for coverage enhancement; and
control the transceiver to receive a multimedia broadcast multicast service (MBMS) service during the first MCCH modification period based on the repetition number in the information on the repetition for coverage enhancement,
wherein the first MCCH modification period is larger than a second MCCH modification period which is for a UE not requiring coverage enhancement.

* * * * *